US005835100A

United States Patent [19]
Matsufusa

[11] Patent Number: 5,835,100
[45] Date of Patent: Nov. 10, 1998

[54] METHOD AND SYSTEM FOR DISPLAYING CHARACTERS COMPOSED OF MULTILE JUXTAPOSED IMAGES WITHIN A DISPLAY DEVICE OF A DATA PROCESSING SYSTEM

[75] Inventor: Ichiroh Matsufusa, Sagamihara, Japan

[73] Assignee: International Business Machines Corp., Armonk, N.Y.

[21] Appl. No.: 688,826

[22] Filed: Jul. 31, 1996

Related U.S. Application Data

[63] Continuation of Ser. No. 390,172, Feb. 17, 1995, abandoned.

[30] Foreign Application Priority Data

Feb. 25, 1994 [JP] Japan .................................... 6-27892

[51] Int. Cl.[6] ........................................ G06F 3/14
[52] U.S. Cl. ........................................ 345/467; 707/535
[58] Field of Search .................................... 707/530, 531, 707/535, 536, 526, 542; 345/467, 468, 471, 141

[56] References Cited

U.S. PATENT DOCUMENTS

| | | | |
|---|---|---|---|
| 5,109,352 | 4/1992 | O'Dell | 395/150 |
| 5,175,811 | 12/1992 | Sone et al. | 395/150 |
| 5,212,769 | 5/1993 | Pong | 395/150 |
| 5,251,293 | 10/1993 | Ishii et al. | 395/151 |
| 5,293,587 | 3/1994 | Deb et al. | 395/162 |
| 5,305,207 | 4/1994 | Chiu | 364/419.09 |
| 5,313,573 | 5/1994 | Takahama | 395/150 |
| 5,367,620 | 11/1994 | Ito et al. | 395/150 |
| 5,468,077 | 11/1995 | Motokado et al. | 400/76 |
| 5,673,064 | 9/1997 | Seto | 345/127 |

FOREIGN PATENT DOCUMENTS

| | | |
|---|---|---|
| 59-028190 | 2/1984 | Japan . |
| 01161970 | 6/1989 | Japan . |
| 03001186 | 1/1991 | Japan . |

*Primary Examiner*—Stephen S. Hong
*Attorney, Agent, or Firm*—Andrew J. Dillon; Brian F. Russell

[57] ABSTRACT

The character patterns of all kana (Japanese characters) or kanji (Chinese characters) to be displayed are divided substantially into halves in a horizontal direction (or alternately in a vertical direction) and stored in memory. Image codes corresponding to the divided character patterns thus obtained are assigned thereto, so that an image code is assigned to a corresponding portion of a kana or kanji. Accordingly, when the kana or kanji is displayed, the two image codes (character codes corresponding to the left and right sides of the same character) which are assigned to the above described character patterns are written to addresses of a buffer corresponding to the location on the screen the kana or kanji is to be displayed. Thus, the two portions of the kanji to be displayed are displayed in adjacent areas on the screen of a display device.

20 Claims, 16 Drawing Sheets

| Mode (Hex) | Type | Maximum Colors | Alphanumeric Formal | Buffer Start |
|---|---|---|---|---|
| 0, 1 | A/N | 16 | 40 x 25 | B8000H |
| 2, 3 | A/N | 16 | 80 x 25 | B8000H |
| 4, 5 | APA | 4 | 40 x 25 | B8000H |
| 6 | APA | 2 | 80 x 25 | B8000H |
| 7 | A/N | Monochrome | 80 x 25 | B0000H |
| 8 | APA | 16 | 20 x 25 | B0000H |
| 9 | APA | 16 | 40 x 25 | B0000H |
| A | APA | 4 | 80 x 25 | B0000H |
| B, C | Reserved | | | |
| D | APA | 16 | 40 x 25 | A0000H |
| E | APA | 16 | 80 x 25 | A0000H |
| F | APA | Monochrome | 80 x 25 | A0000H |
| 10 | APA | 16 | 80 x 25 | A0000H |
| 11 | APA | 2 | 80 x 30 | A0000H |
| 12 | APA | 16 | 80 x 30 | A0000H |
| 13 | APA | 258 | 40 x 25 | A0000H |
| 14 | A/N | 18 | 132 x 25 | B8000H |

APA = All points addressable ( graphics )
A/N = Alphanumeric ( text )

*Fig. 10*

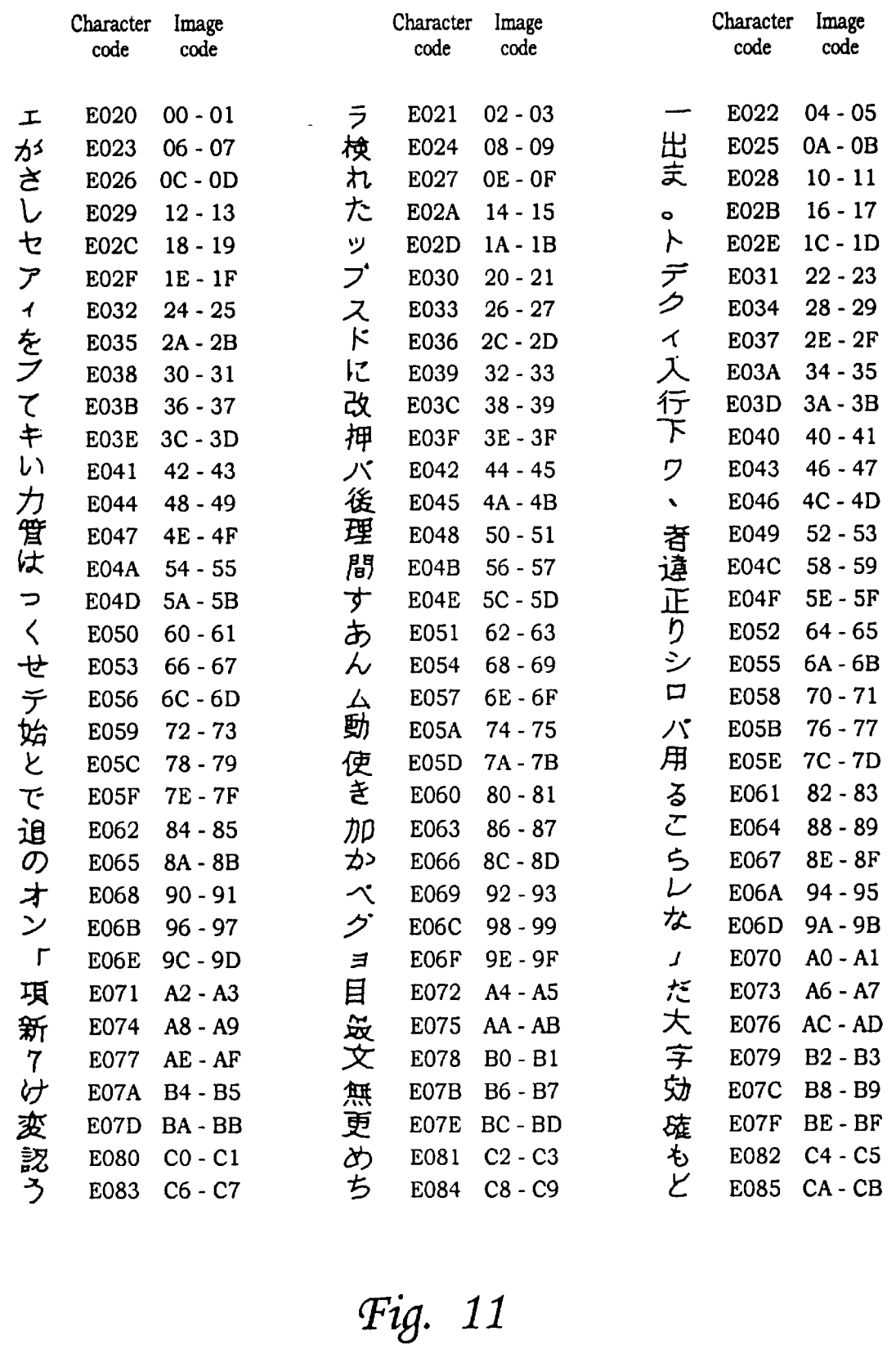

| | Character code | Image code | | Character code | Image code | | Character code | Image code |
|---|---|---|---|---|---|---|---|---|
| エ | E020 | 00 - 01 | ラ | E021 | 02 - 03 | ー | E022 | 04 - 05 |
| が | E023 | 06 - 07 | 検 | E024 | 08 - 09 | 出 | E025 | 0A - 0B |
| さ | E026 | 0C - 0D | れ | E027 | 0E - 0F | ま | E028 | 10 - 11 |
| し | E029 | 12 - 13 | た | E02A | 14 - 15 | 。 | E02B | 16 - 17 |
| セ | E02C | 18 - 19 | ッ | E02D | 1A - 1B | ト | E02E | 1C - 1D |
| ア | E02F | 1E - 1F | プ | E030 | 20 - 21 | デ | E031 | 22 - 23 |
| ィ | E032 | 24 - 25 | ス | E033 | 26 - 27 | ク | E034 | 28 - 29 |
| を | E035 | 2A - 2B | ド | E036 | 2C - 2D | イ | E037 | 2E - 2F |
| フ | E038 | 30 - 31 | に | E039 | 32 - 33 | 入 | E03A | 34 - 35 |
| て | E03B | 36 - 37 | 改 | E03C | 38 - 39 | 行 | E03D | 3A - 3B |
| キ | E03E | 3C - 3D | 押 | E03F | 3E - 3F | 下 | E040 | 40 - 41 |
| い | E041 | 42 - 43 | バ | E042 | 44 - 45 | ワ | E043 | 46 - 47 |
| 力 | E044 | 48 - 49 | 後 | E045 | 4A - 4B | 、 | E046 | 4C - 4D |
| 管 | E047 | 4E - 4F | 理 | E048 | 50 - 51 | 者 | E049 | 52 - 53 |
| は | E04A | 54 - 55 | 間 | E04B | 56 - 57 | 違 | E04C | 58 - 59 |
| っ | E04D | 5A - 5B | す | E04E | 5C - 5D | 正 | E04F | 5E - 5F |
| く | E050 | 60 - 61 | あ | E051 | 62 - 63 | り | E052 | 64 - 65 |
| せ | E053 | 66 - 67 | ん | E054 | 68 - 69 | シ | E055 | 6A - 6B |
| テ | E056 | 6C - 6D | ム | E057 | 6E - 6F | ロ | E058 | 70 - 71 |
| 始 | E059 | 72 - 73 | 動 | E05A | 74 - 75 | パ | E05B | 76 - 77 |
| と | E05C | 78 - 79 | 使 | E05D | 7A - 7B | 用 | E05E | 7C - 7D |
| で | E05F | 7E - 7F | き | E060 | 80 - 81 | る | E061 | 82 - 83 |
| 追 | E062 | 84 - 85 | 加 | E063 | 86 - 87 | こ | E064 | 88 - 89 |
| の | E065 | 8A - 8B | か | E066 | 8C - 8D | ら | E067 | 8E - 8F |
| オ | E068 | 90 - 91 | ベ | E069 | 92 - 93 | レ | E06A | 94 - 95 |
| ン | E06B | 96 - 97 | グ | E06C | 98 - 99 | な | E06D | 9A - 9B |
| 「 | E06E | 9C - 9D | ョ | E06F | 9E - 9F | 」 | E070 | A0 - A1 |
| 項 | E071 | A2 - A3 | 目 | E072 | A4 - A5 | だ | E073 | A6 - A7 |
| 新 | E074 | A8 - A9 | 数 | E075 | AA - AB | 大 | E076 | AC - AD |
| 7 | E077 | AE - AF | 文 | E078 | B0 - B1 | 字 | E079 | B2 - B3 |
| け | E07A | B4 - B5 | 無 | E07B | B6 - B7 | 効 | E07C | B8 - B9 |
| 変 | E07D | BA - BB | 更 | E07E | BC - BD | 確 | E07F | BE - BF |
| 認 | E080 | C0 - C1 | め | E081 | C2 - C3 | も | E082 | C4 - C5 |
| う | E083 | C6 - C7 | ち | E084 | C8 - C9 | ど | E085 | CA - CB |

*Fig. 11*

METHOD AND SYSTEM FOR DISPLAYING CHARACTERS COMPOSED OF MULTILE JUXTAPOSED IMAGES WITHIN A DISPLAY DEVICE OF A DATA PROCESSING SYSTEM

This is a continuation of application Ser. No. 08/390,172 filed Feb. 17, 1995 abandoned.

BACKGROUND OF THE INVENTION

1. Technical Field

The present invention relates in general to a method and system for data processing and, in particular, to a method and system for displaying data within a display device of a data processing system. Still more particularly, the present invention relates to a method and system for displaying alphanumeric characters within a display device of a data processing system.

2. Description of the Related Art

Devices using a kanji display adapter and devices using a graphics display adapter are already known for displaying kana (Japanese characters) and kanji (Chinese characters) on the screen of a display device.

As shown in FIG. 16, in the case of a device using a kanji display adapter, a character generator 402 is searched utilizing 16-bit character codes which are stored in a character code buffer 400. The character patterns matching the character codes are displayed on the screen of a display device 404.

As depicted in FIG. 17, a device utilizing the graphics display adapter is designed to display a kanji pattern as a graphic form by employing a graphics display adapter manufactured specifically to display the kanji patterns stored outside of the adapter in graphic forms. That is, in the case of such devices, the kanji patterns 408 stored outside of the adapter (for example, in an operating system (OS)) in accordance with software 406 are, as illustrated in FIG. 18, transferred to a graphics buffer 410 as graphic forms so that the kanji are displayed on the screen of a display device 404.

However, in the system illustrated in FIG. 16 which utilities a kanji display adapter, all character patterns to be displayed must be stored in character generator 402. Since kanji include many types of characters, a ROM of large capacity has to be provided. In addition, the circuit used to fetch the 16-bit character codes from character code buffer 400 is complex due to the number of characters. As a result, the device may become prohibitively expensive.

In addition, in display methods utilizing a graphics display adapter like that depicted in FIG. 17, the software for displaying the characters or graphic forms becomes complicated, and, above all, the display speed is slow. Still further, in a case where the same kanji is displayed in a number of locations on the same screen, the disadvantage arises that the character image must be transferred once for each location it is displayed.

In the case of a special kanji consisting of the base of a Chinese character (referred to hereinafter as the base) and the left-hand radical of a Chinese character (referred to hereafter as the left-hand radical), it is to be noted that the kanji can be displayed with good efficiency by combining the base with the left-hand radical. However, it is difficult to display kanji or kana or the like which are not formed by the combination of the base and the left-hand radical in accordance with the same method as in the case of a kanji composed of the base and the left-hand radical.

SUMMARY OF THE INVENTION

It is therefore one object of the present invention to provide a method and system for improved data processing.

It is another object of the present invention to provide an improved method and system for displaying data within a display device of a data processing system.

It is yet another object of the present invention to provide an improved method and system for displaying alphanumeric characters within a display device of a data processing system.

The character patterns of all kana (Japanese characters) or kanji (Chinese characters) to be displayed are divided substantially into halves in a horizontal direction (or alternately in a vertical direction) and stored in memory. Image codes corresponding to the divided character patterns thus obtained are assigned thereto, so that an image code is assigned to a corresponding portion of a kana or kanji. Accordingly, when the kana or kanji is displayed, the two image codes (character codes corresponding to the left and right sides of the same character) which are assigned to the above described character patterns are written to addresses of a buffer corresponding to the location on the screen the kana or kanji is to be displayed. Thus, the two portions of the kanji to be displayed are displayed in adjacent areas on the screen of a display device.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 10 is a table depicting the contents of a video mode table;

FIG. 11 is a table depicting the relationship between the character codes (data in ROM), the image codes (the contents written to a code buffer), and characters displayed within the display screen;

DETAILED DESCRIPTION OF PREFERRED EMBODIMENT

Figure 1:
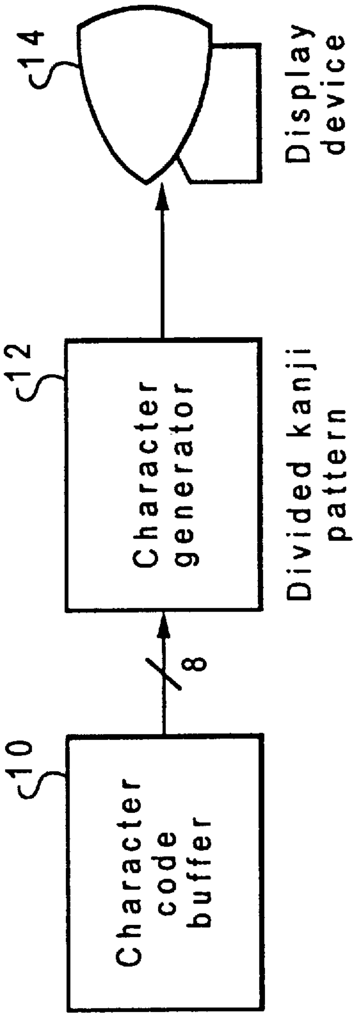
FIG. 1 is a block diagram illustrating the system of the present invention.

With reference now to the figures and in particular with reference to FIG. 1, there is illustrated a conceptual block diagram of a display system utilizing the method for displaying characters of the present invention. The display system comprises character code buffer 10, a character generator 12, and a display device 14. According to the character display method of the present invention, image codes corresponding to divided parts of a character are input into character code buffer 10. The character generator 12, which stores the character patterns obtained by previous division of characters in association with image codes, is searched based on the image codes input into the character code buffer 10. Then, the character patterns which match the input image codes are simultaneously displayed in adjacent regions on the screen of the display device 14.

Utilizing this method, for example, all of the character patterns of kana (Japanese characters) and kanji (Chinese characters) to be displayed (each character comprising 16 dots in a transverse direction) are obtained by dividing each character substantially into two halves in a horizontal direction (or in a vertical direction) so that each character pattern is composed of 8 dots in the transverse direction. The character patterns thus obtained are stored beforehand in character generator 12. Image codes consisting of 8 bits respectively corresponding to the character patterns obtained by the division are assigned to the character patterns thus obtained, so that the image codes, each consisting of 8 bits corresponding to the two character patterns on the left and right sides for each kana and kanji are assigned thereto. Therefore, when it is desired to display a kana or kanji, two image codes (the image codes corresponding to the left and right sides of the same character) which are assigned to the character patterns as stated above are written to the address of character code buffer 10 which corresponds to a location on the screen where it is desired to display the kana or kanji. As a result, the kanji to be displayed is displayed on the screen of display device 14. When the types of characters which shall be displayed are limited, it is not necessary to employ a ROM of large capacity. One skilled in the art will appreciate that the character pattern of each kana or kanji may be divided into four parts, and image codes composed of 8 bits are assigned to the four parts so that these four parts may be simultaneously displayed on the screen of the display device 14.

Figure 2:
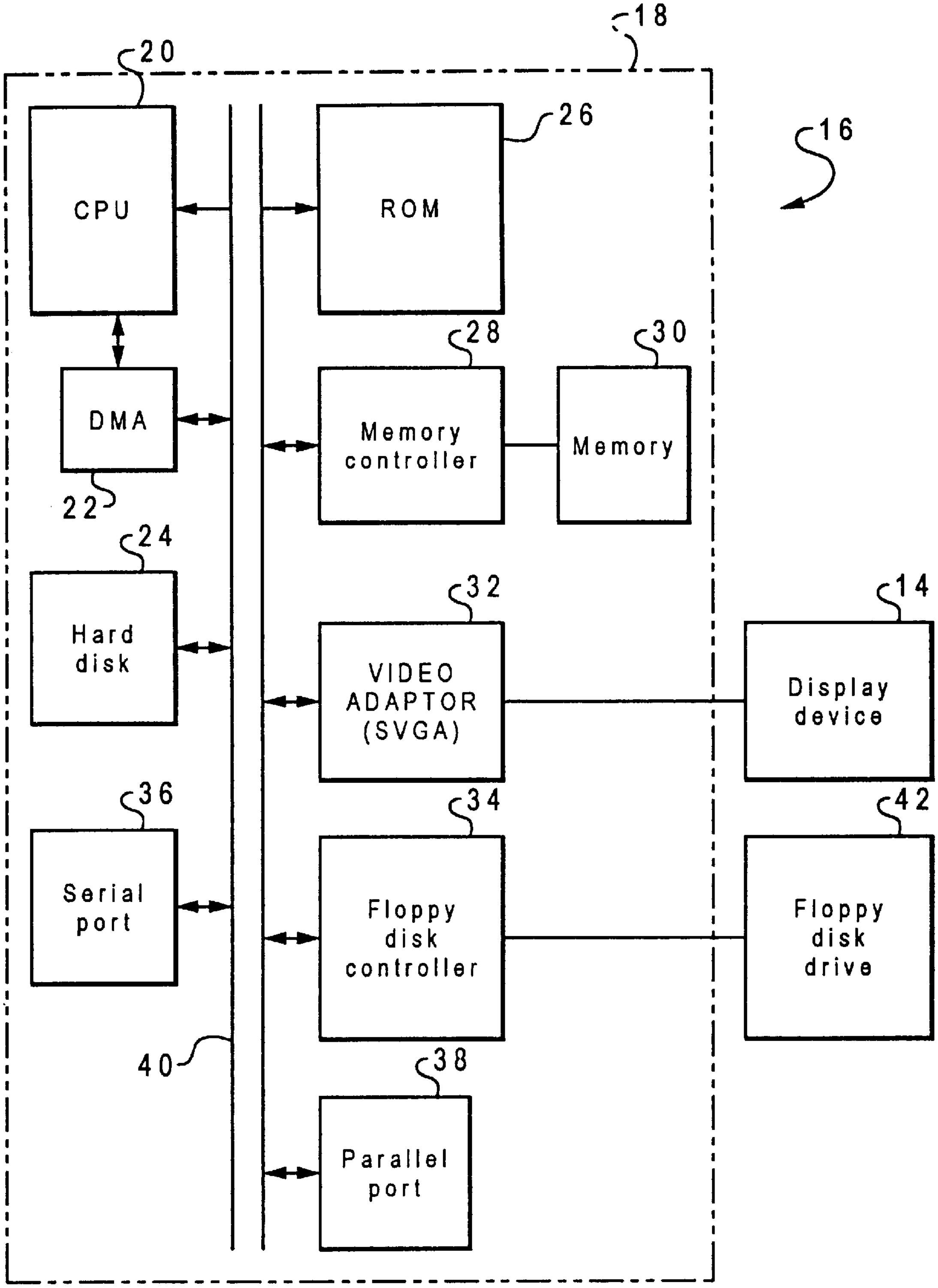
FIG. 2 is a block diagram depicting the configuration of a character display device according to a preferred embodiment of the present invention.

Referring now to FIG. 2, there is depicted a block diagram of a data processing system utilizing the character display method of the present invention. Data processing system 16 includes personal computer 18 and CRT color display device 14 as a display device. The personal computer 18 comprises CPU 20, a DMA controller 22, a hard disk 24, a ROM 26, a memory controller 28, memory 30, a video adapter 32, a floppy disk controller 34, a serial port 36, and a parallel port 38 or the like. The components of personal computer 18 are connected to one another through system bus 40.

In ROM 26, character codes and other data are stored beforehand using programs such as a POST program or a VIDEO BIOS program, which will be described later. Memory 30 functions as a work area and is composed of RAM. A floppy disk drive 42 is connected to the floppy disk controller 34. The floppy disk controller 34 controls the reading of information from and the writing of information to a diskette (not shown) which is inserted into the floppy disk drive 42.

Figure 3:
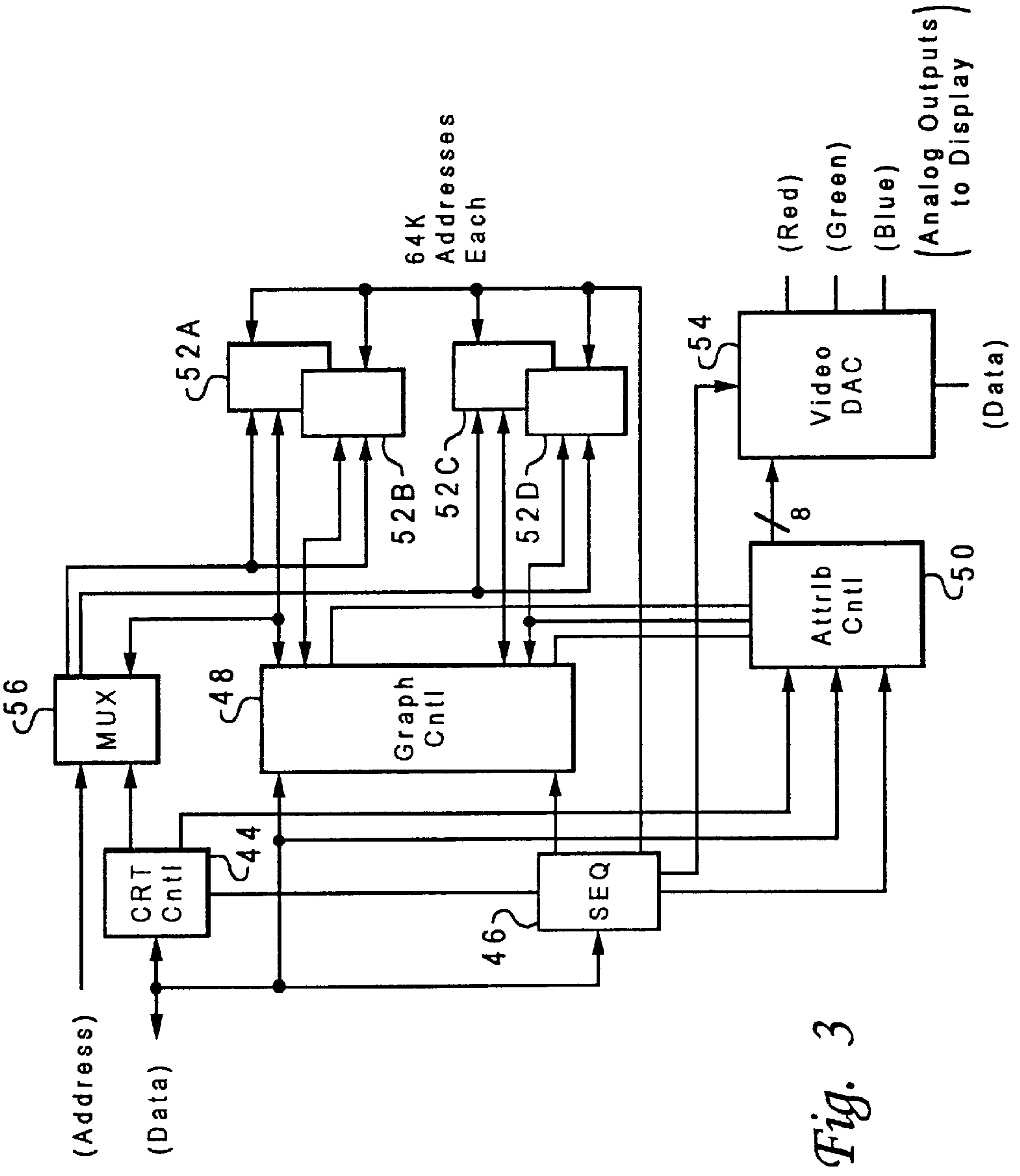
FIG. 3 is a block diagram conceptually illustrating the configuration of the video adaptor of FIG. 2.

With reference now to FIG. 3, there is illustrated the configuration of the video adapter 32. Video adapter 32 is comprised of a CRT controller 44, a sequencer 46, a graphics controller 48, an attribute controller 50, first through fourth maps 52A, 52B, 52C and 52D of the video memory, a video DA converter 54, and a multiplexer 56. In response to the external data, CRT controller 44 generates a horizontal synchronization signal or a vertical synchronization signal.

Graphics controller 48 also utilizes external data to access maps 52A, 52B, 52C and 52D of video memory. That is, the above described CPU 20 can have access to first through fourth maps 52A, 52B, 52C, and 52D of the video memory through the graphics controller 48. In the first map 52A and the second map 52B of the video memory, the image codes of an n-sized character (alphanumeric character) and the image codes of the left half and right half of an m-sized character (kana or kanji), which will be described hereafter, are stored in a mixed state. In the third map 52C of the video memory, the character pattern of the n-sized character or the character patterns of the two parts divided into the left and right sides of the m-sized character are stored. In the addresses of the first map 52A and the second map 52B of the video memory, the image codes are stored in accordance with the format shown in FIG. 13. As a result, the character patterns corresponding to the image codes are displayed at the locations on the screen of display device 14 which correspond to the addresses within first and second maps 52A and 52B.

Figure 4:
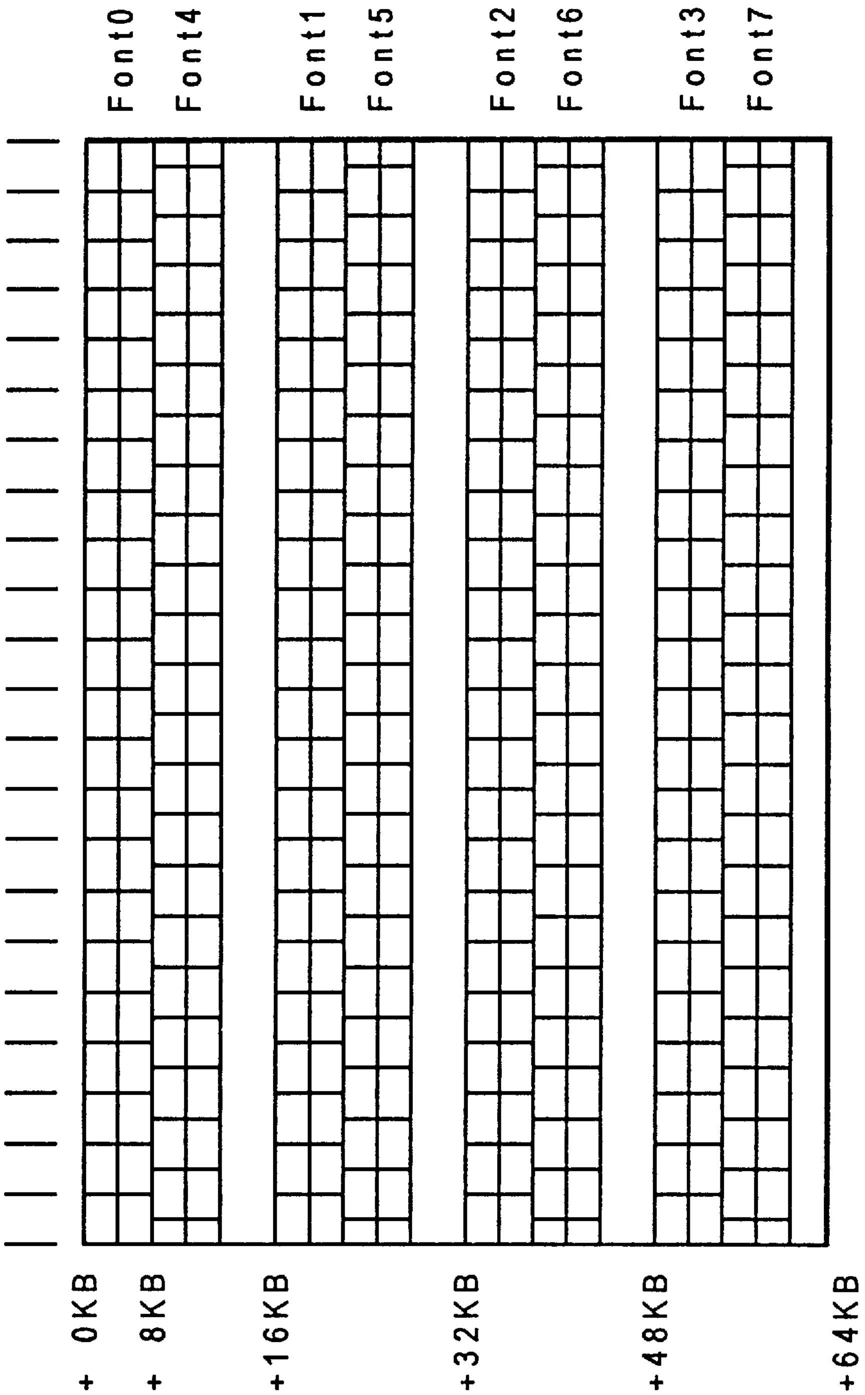
FIG. 4 is a view depicting an example of the internal format of a second map of the video memory of FIG. 3.

Referring now to FIG. 4, there is depicted an example of the internal format of the third map 52C. As can be seen from FIG. 4, 8 sets of fonts consisting of font 0 to font 7 are prepared beforehand. Any font can include character patterns of 256 n-sized characters or character patterns of 128 kana or kanji. For example, 256 alphanumeric characters which are n-sized characters can be included in font 0 and 128 kana or kanji (in this case, 256 halves which are formed by dividing each kana or kanji character into left and right sides) can be included in font 1. Two fonts of fonts 0–7 can be simultaneously displayed on the same screen. Specifically, based on the setting of the CRT controller 44, any one of the sets of fonts consisting of font 0 to font 7 can be selected as a main font when a bit (bit 3) of an attribute byte, which will be described later, is 0 and as a subfont when bit 3 is 1.

Returning now to FIG. 3, multiplexer 56 can select and switch either the first map 52A or the second map 52B of the video memory, and either the third map 52C or the fourth map 52D of the video memory in accordance with input address data or a signal from CRT controller 44.

The sequencer 46 serves to control the sequence of processing for each part. The attribute controller 50 controls an attribute based on a signal from the CRT controller 44 and external data. The video DA converter 54 outputs analog R, G, and B signals in accordance with a signal from the attribute controller 50 to the CRT color display device 14.

The method of displaying characters according to the present invention, utilizing data processing system 16 constructed as stated above, will now be described with reference to the flowcharts depicted in FIGS. 5–9 which illustrate the main control routines of CPU 20. First, the POST (power on /self test) routine shown in FIG. 5 will be described. This routine is used to effect the initialization and testing of each module. This routine starts when a power switch (not illustrated in FIG. 2) is turned on.

In steps 100 to 102, the initialization and testing of the memory controller 28 are executed. In step 104, a first test of memory 30 is performed. Next, in step 106, the initialization and testing of the video adapter 32 are performed and, in step 108, the second test of memory 30 is executed. Thereafter, in step 110, the testing and initialization of the DMA controller 22 are performed; and in step 112, the testing and initialization of other modules are performed. Thus, the POST routine finishes and the routine branches to the password check routine illustrated in FIGS. 6 and 7. This password check routine checks a password which an operator inputs and executes other interactive processing.

Figure 5:
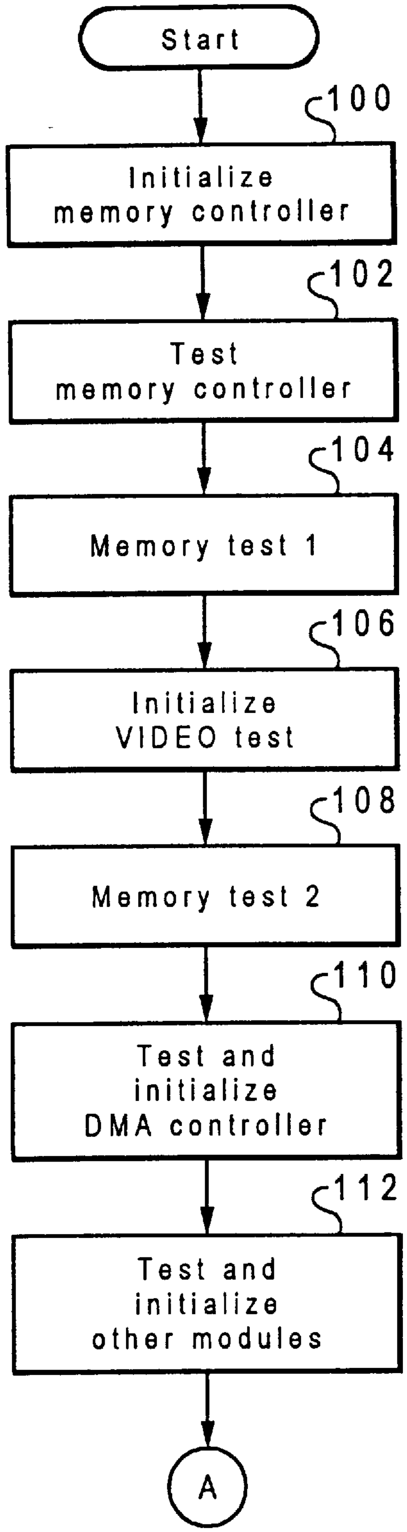
FIG. 5 is a flowchart illustrating portion of the main control program of a CPU that comprises a POST (Power On Self Test) routine.
Figure 6:
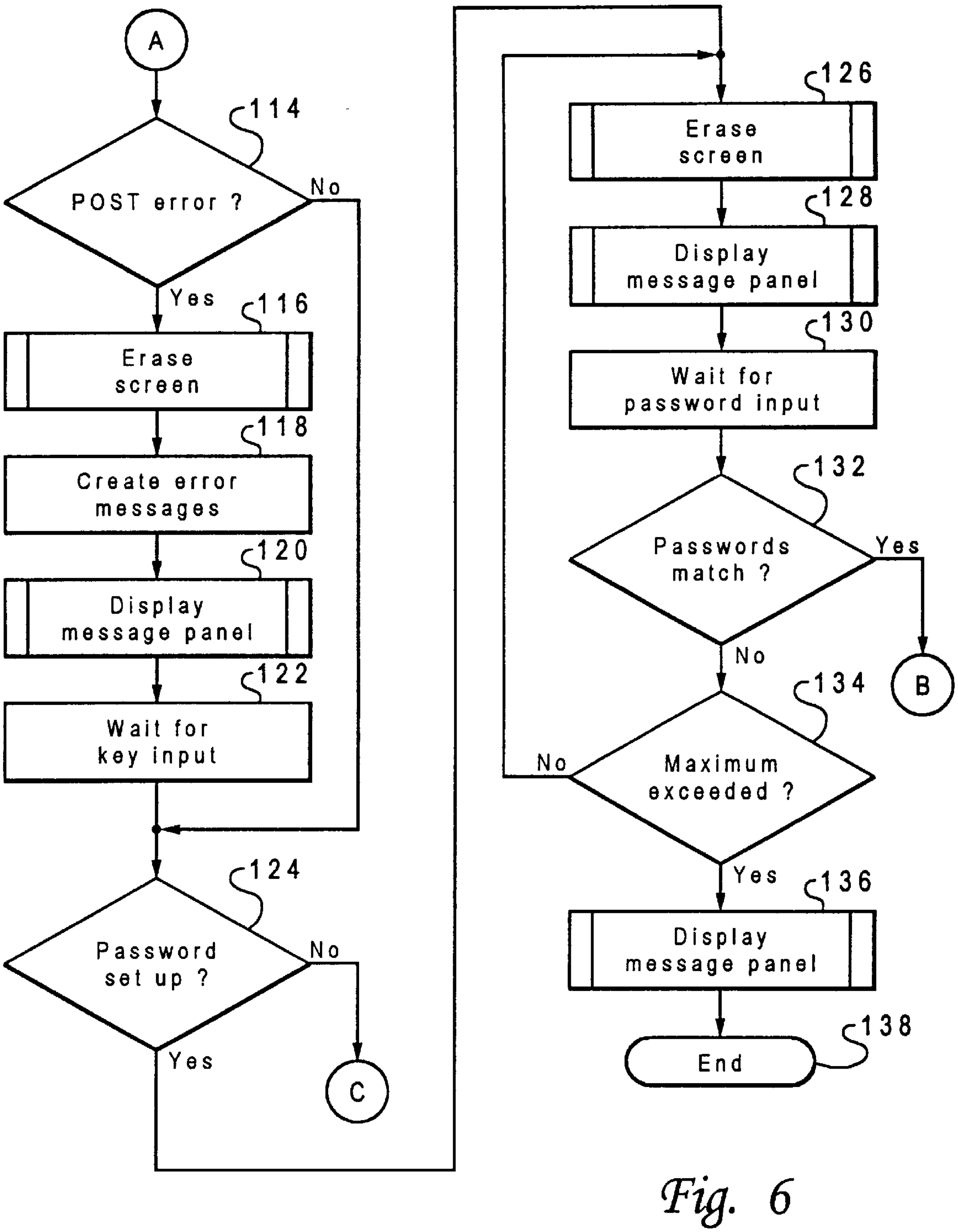
FIG. 6 is a flowchart depicting a portion of the main control program of a CPU which comprises a part of a password check routine.

With reference now to FIG. 6, in step 114 it is determined whether or not a POST error is present based on the result of each test performed in FIG. 5. If no problem is found in the connection and operation of each module, the process advances to step 124, which will be described below. However, if a problem is present in the connection and operation of any module and a POST error is found, the process branches to a subroutine to erase the screen in step 116.

Figure 8:
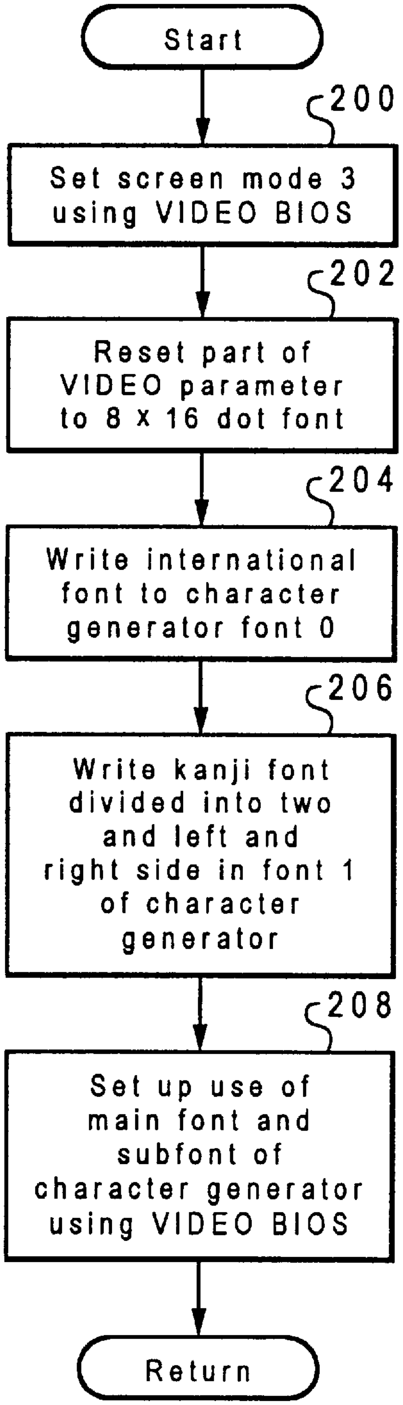
FIG. 8 is a flowchart depicting a subroutine for erasing the display screen.

In this subroutine, as illustrated in FIG. 8, "a screen mode 3" is set at step 200 by employing VIDEO BIOS stored in ROM 26. Herein, the "screen mode 3" means the text mode of an alphanumeric character (A/N) type having 80 rows×25 columns of a video table as can be seen in FIG. 10.

Returning to FIG. 8, in the next step 202, a part of a VIDEO parameter is reset to a 8×16 dot font. This step is performed because an alphanumeric n-sized character has a 9 dot width. When a kanji is displayed utilizing this width as is, as will be described later, spaces are left at the left and right sides of the kanji. Therefore, when an 8 dot width is originally employed, step 202 is not necessary.

The process then proceeds to step 204, in which an international font including characters to which accent symbols are attached which are used in Europe, etc., is written to font 0 of the character generator (a functional part of video adapter 32). Next, in step 206, the font of a kanji which is divided into left and right halves is written to font 1 of the character generator. In the next step 208, font 0 and font 1 of the character generator are set so as to be used respectively as a main font and as a subfont at the same time by utilizing the VIDEO BIOS. Finally, the subroutine to erase the screen finishes and control is returned to the main routine illustrated in FIG. 6.

After control is returned to the main routine, messages are created in step 118 of FIG. 6. Then, processing branches to a subroutine to display a message panel in step 120.

Figure 9:
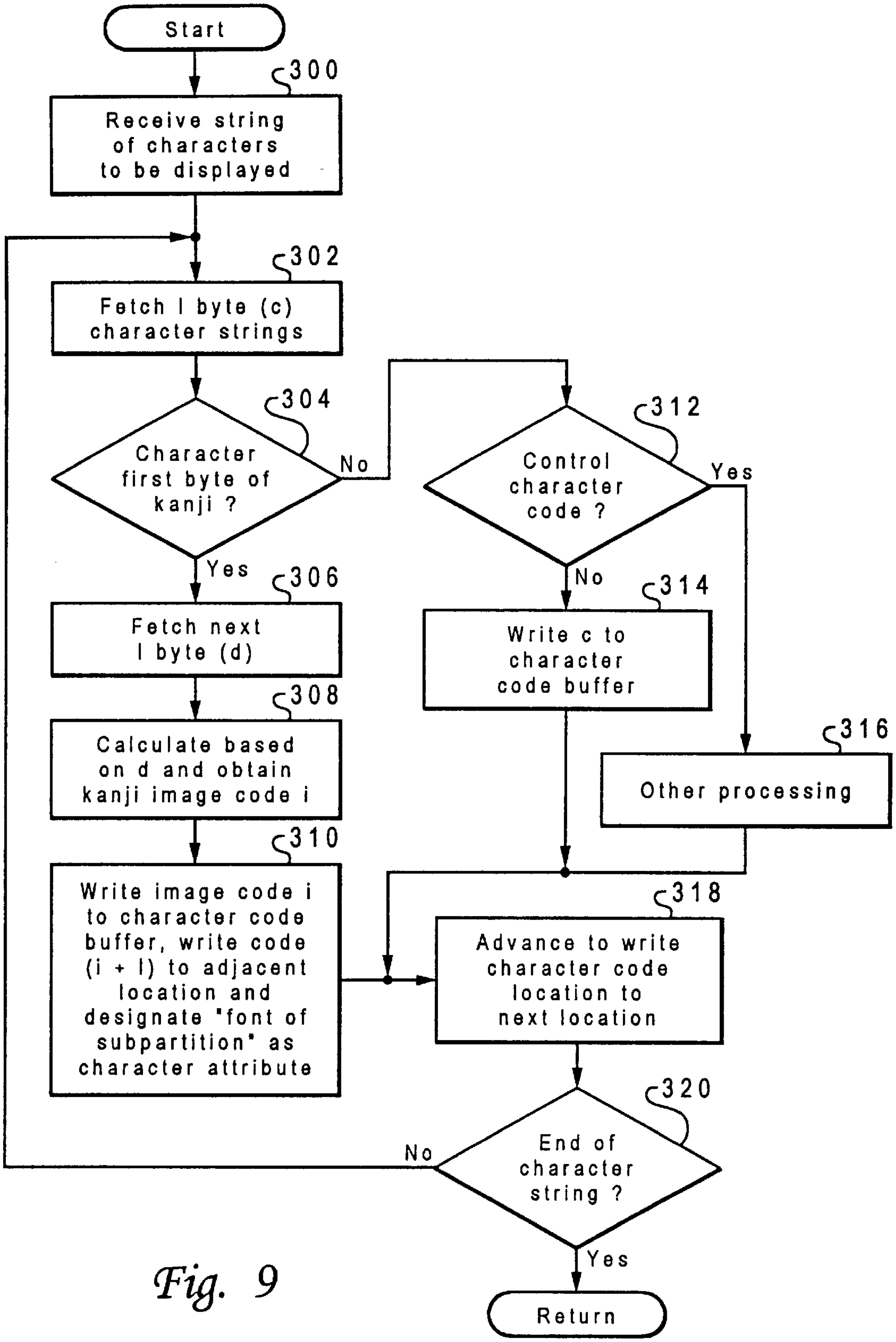
FIG. 9 is a flowchart illustrating a subroutine for displaying a message panel within the display screen.

In this subroutine, as illustrated in FIG. 9, a string of characters composed of the character codes which correspond to the messages created in step 118 are received from memory 30 at step 300 (the string of characters created in step 118 are stored in memory 30). Then, processing continues to step 302 in which one byte (represented by c, for convenience) is taken out of the series of characters.

In step 304, it is determined whether or not one byte (c) which is taken out of the string of characters is a code indicating the first byte of a kanji. If not the process proceeds to step 312. In contrast, if the byte in question designates a code indicating the first byte of a kanji, processing continues to step 306 and the next byte (represented by d, for convenience) is fetched. Then, processing continues to step 308 and a prescribed calculation (this calculation will be described below) is executed based on the byte (d) taken out in step 306 so that an image code i of the kanji is obtained.

In the next step, 310, an image code i is written to the character code buffer which in the present embodiment corresponds to first map 52A and second map 52B of the video memory. Then, a code (i+1) is written to a location adjacent to the location where this image code i is written. Further, "a subfont" is designated as an attribute of a character. After this processing is executed, processing continues to step 318.

In step 318, the location for writing a character code is advanced to the next location. Processing continued to step 320 to decide whether or not the string of characters ends. When the end of the string of characters is found, control is returned to the main routine (the routine of the password check program). If the end of the string of characters has not been reached, processing returns to step 302 so that the above-mentioned processing and decisions are repeated.

If a determination is made at step 304 that the one byte character string is not a kanji, the process proceeds to step 312, which illustrates a determination of whether or not the byte (c) is the code of a control character. If the byte (c) is the code of the control character, for example, a line feed instruction code or the like, processing continues to step 316. Then, after the indicated processing is executed, processing continues to step 318. However, if the byte is not the code of a control character at step 312, the code c fetched in step 302 is written to the character code buffer, "a main font" is designated as an attribute of the character, and then the process proceeds to step 318, which has been described. In accordance with the processing of this subroutine, for example, a message stating, "An error was detected. Insert the setup disk in drive A and press the line feed (Enter) key," is displayed on the screen of the CRT display device 14.

Returning to FIG. 6, in step 122 of the main routine, the process waits for key input (e.g., the input of a line feed key). After the key input, processing continues to step 124. In step 124, it is determined whether or not the setting of a password is finished. If the setting of the password is not finished, processing branches to step 144 illustrated in FIG. 7. When the setting of the password is finished, processing continues at step 126 of FIG. 6 so that the screen is erased as was performed at step 116. Then, a message panel is displayed as was described above at step 128. At step 128, for example, a message such as, "Input a password and then press the line feed (Enter) key," or "Input a controller password and then press the line feed (Enter) key," is displayed on the screen of CRT color display device 14.

Next, in step 130, the system waits for an operator to input a password. When the password is input, processing continues to step 132, which illustrates a determination of whether or not the set password coincides with the input password. If the passwords match each other, processing branches to step 140 which will be described later with reference to FIG. 7. If the passwords do not match each other, processing continues to step 134, which depicts a determination of whether or not the number of inputs of the password exceeds the maximum number of times. If the number of inputs does not exceed the maximum number of times, the process returns to step 126 to repeat the processing and decisions described above. In this case, at step 128, a message, "The input password is incorrect. After the correct password is input, press the line feed (Enter) key," is displayed on the screen of the CRT color display device 14. However, if the number of inputs of the password exceeds the maximum number of times, processing continues to step 136 so that the display of a message panel is carried out as mentioned above. In this case, an alarm message, "The password is incorrect. The system has locked," is displayed on the screen of the CRT color display device 14. After that, the control operation terminates at step 138.

Figure 7:
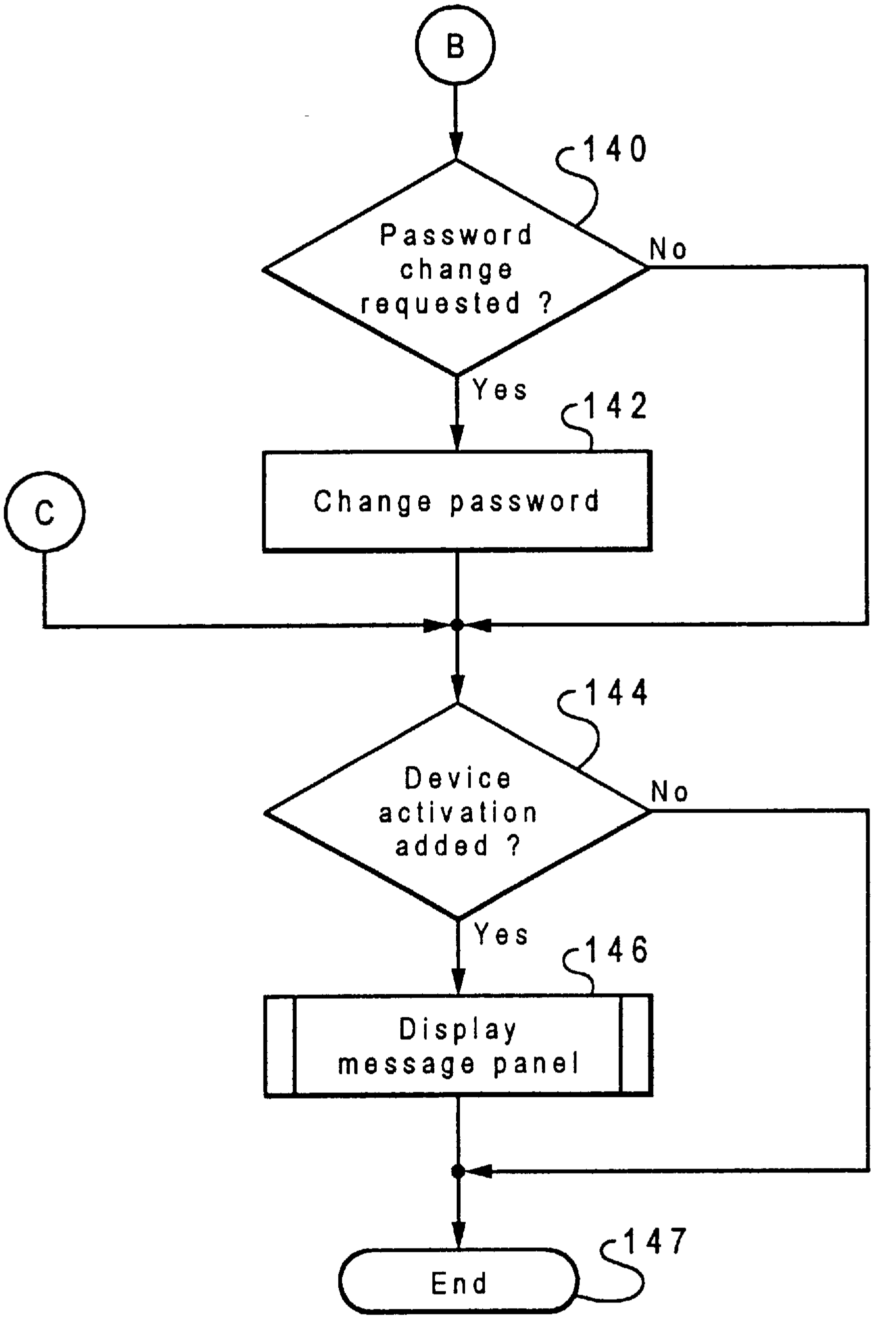
FIG. 7 is a flowchart illustrating the remaining portion of the password check routine of FIG. 6.

With reference now to FIG. 7, in step 140 it is determined whether or not a change of the password is requested. If a password change is requested processing continues at step 142, where the password is changed. Then, processing continues to step 144. However, if the user has not requested to change the password, processing proceeds from step 140 to step 144. Whether or not the password is changed depends on the last part of a string of characters input as the password which includes an instruction at this step. In other words, when the "Enter" key is pressed, the process determines that a request to change the password does not exist. When the "Esc" key is pressed, for example, the process determines that a request to change the password is present.

At step 144, a determination is made whether or not an activation device has been added. If the activation device has not been added, the routine of the password check program terminates at step 147. If the activation device has been added, processing continues at step 146 where a message panel is displayed as described above. Then, the routine of the password check program terminates at step 147. At step 146, a message such as "A device capable of being used as a starting device was added. If the operating system is started from this device, add this device to the item of 'a starting option'," is displayed on the screen of CRT color display device 14. After the routine of the password check program is finished, the OS (operating system) is activated.

Figure 12:
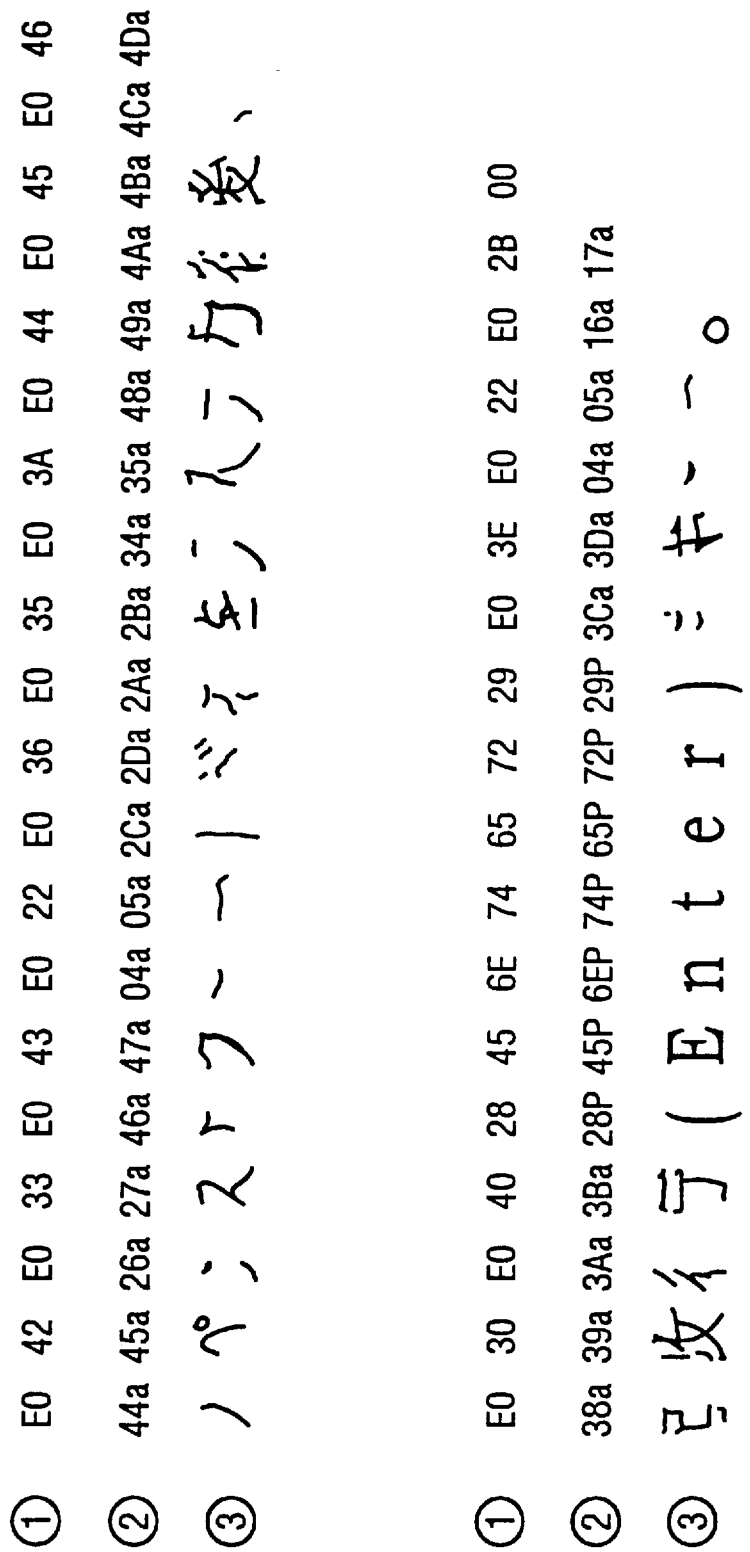
FIG. 12 depicts an example of a kanji message illustrating the correspondence of the character codes and image codes employed in a preferred embodiment of the present invention.
Figure 13:
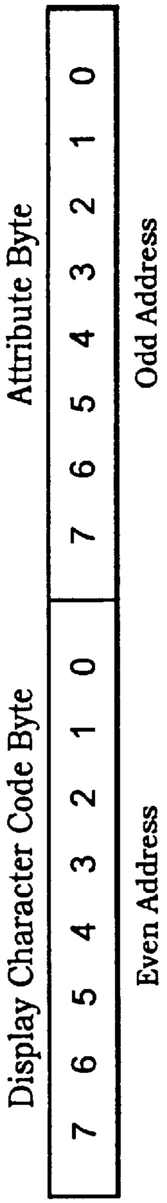
FIG. 13 illustrates the character attribute format of the image codes.

A method for displaying a message panel will be now described in more detail with reference to FIGS. 11–13. FIG. 11 depicts a table in which the character codes used in the present embodiment correspond to the image codes. FIG. 12 illustrates the relationship between the character codes (data in ROM 26), the image codes (the contents written to the code buffer), the distinction between a main font and a subfont, and the characters displayed on the screen. FIG. 13 designates the character attribute format of the image codes.

FIGS. 11–13 will be described in reference to an example in which a message, "Input a password, and then press the line feed (Enter) key," is displayed on the screen at the above-described step 128 of FIG. 6, which invokes the routine depicted in FIG. 9.

First, the process begins and proceeds to step 300, which illustrates the sequence of character codes to be displayed "EO 42 EO 33 . . . EO 2B 00" (see FIG. 12) being received from memory 30. Next, at step 302 one byte (EO) is retrieved from the above described sequence of character codes. The process then determines that the retrieved character is the first byte of a kanji at step 304. Thereafter, the next byte (42) is retrieved at step 306. The image code (44) of the kanji is obtained from this byte (42) by carrying out a calculation at step 308. Namely, after a hexadecimal number "42" is converted to a decimal number "16×4+2=66", (66–32)×2=68 is obtained. "68=4×16+4" of this decimal number is converted again to a hexadecimal number so that an image code i="44" is obtained. Herein, 32 is added beforehand so that the code of a control symbol is not superimposed on the image code.

The image code (44) thus obtained is written to an even address utilizing the character attribute format shown in FIG. 13. Bit 3 of an odd address is turned on (i.e., set to 1) and a subfont is designated as the attribute of the character. Further, a code (45) is written to a location adjacent to the location of the image code (44). Also, at step 310, bit 3 of the odd address is turned on and the subfont is designated as the attribute of the character. The state in which the subfont is designated as the attribute is represented by "a" in FIG. 12.

The process then proceeds to step 302, in which a location in memory which corresponds to a location on the screen where the image code is to be written is advanced to the next location and the next one byte (EO) is retrieved from the character codes input from memory 30. It is determined at step 304 that the character is the first byte of a kanji. Thereafter, the next one byte (33) is retrieved at step 306. Then, processing and decisions of the above described steps, 302, 304, 306, 308, 310, and 320, are similarly repeated. As a result, processing corresponding to the display of the screen represented by "Input a password, and then press the line feed key," is finished.

When the first byte (28) of the remaining portion of the message "28 45 6E . . . " is retrieved, the decision in step 304 is negated. When it is determined that the character is not a kanji or the code of a control character, (28) is written to the character code buffer as is and "a main font" is set as the attribute of the character at steps 312 and 314. The state in which the main font is designated as the attribute of the character is illustrated by "P" in FIG. 12. In a case where the main font is designated as the attribute, above noted font 0 is selected. In a case where the subfont is designated as the attribute, font 1 is selected. Finally, the above-mentioned complete message is displayed on the screen.

Figure 14A:
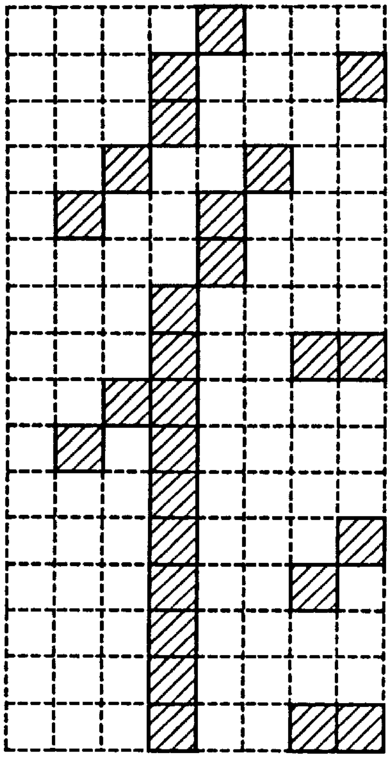
FIGS. 14A and 14B depicts the character patterns of the left half and right half, respectively, of a kanji.
Figure 14B:
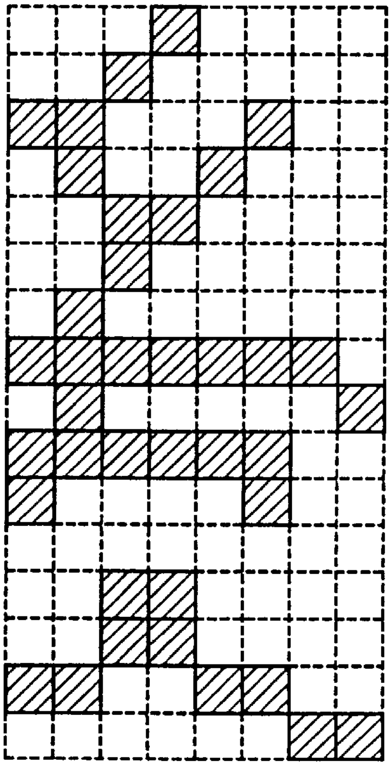
Figure 15:
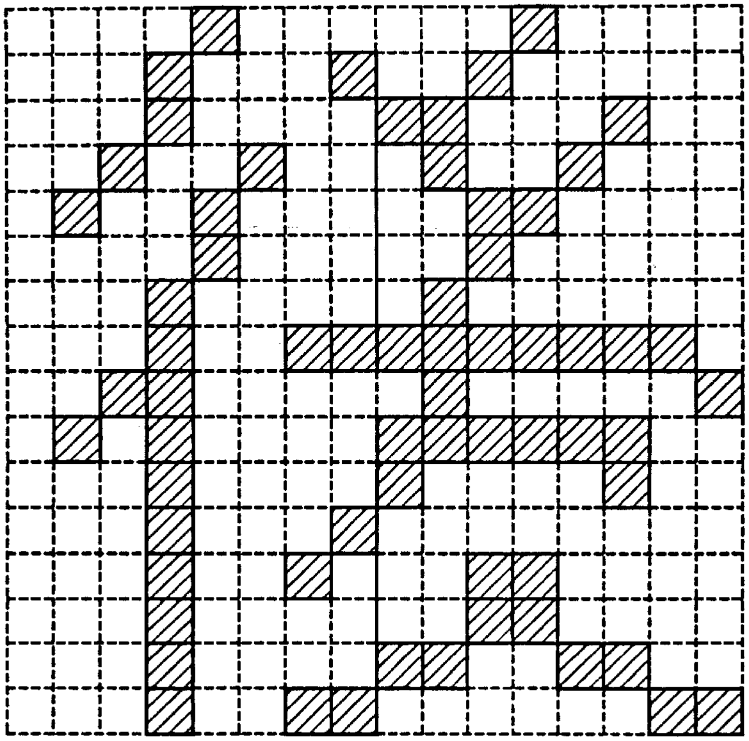
FIG. 15 illustrates the kanji formed by unifying the character patterns depicted in FIGS. 14A and 14B on a display screen.
Figure 16:
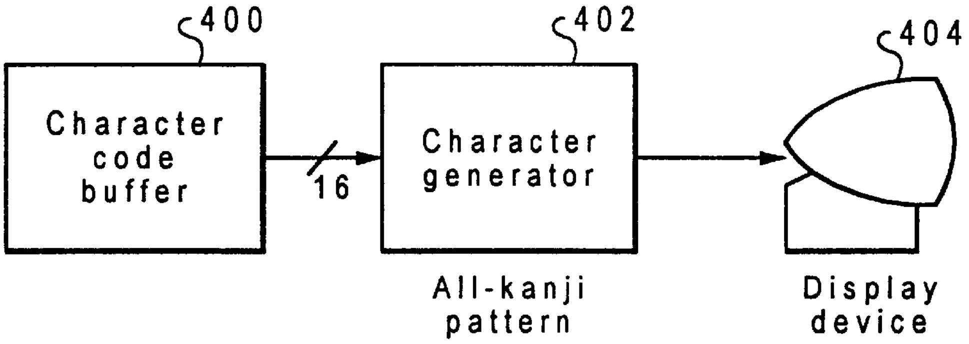
Fig. 16 Prior Art
FIG. 16 illustrates a prior art system for displaying kanji characters.
Figure 17:
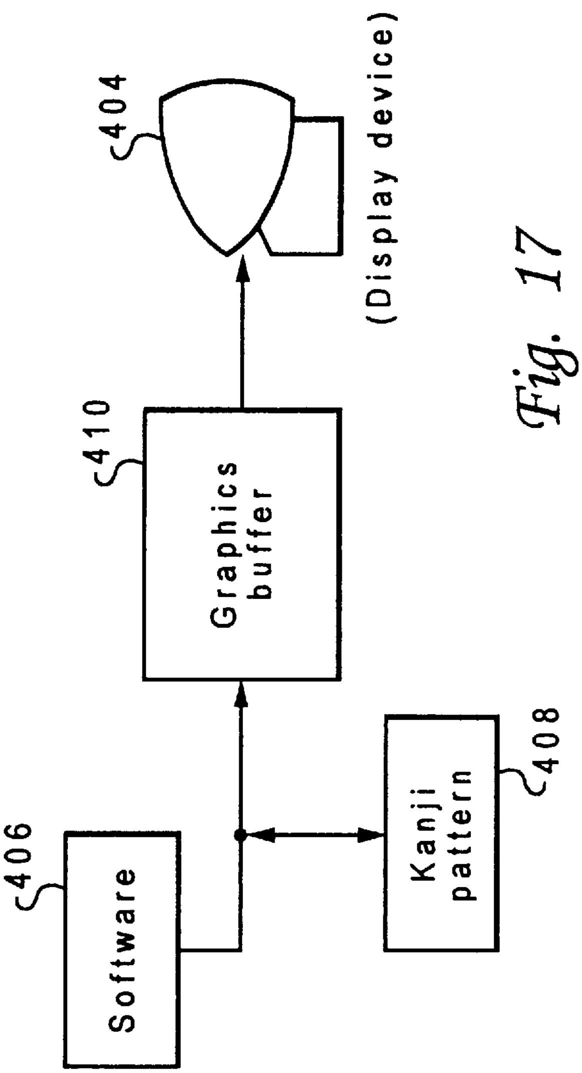
Fig. 17 Prior Art
FIG. 17 depicts a second prior art system for displaying kanji characters.

For example, as illustrated in FIG. 11, based on the character codes (EO45), the image codes (4A–4B) are written to adjacent address locations in character code buffer 10. The pattern of the left half of a kanji which corresponds to the image code 4A, and the pattern of the right half of the kanji which corresponds to the code 4B, are depicted in FIGS. 14A and 14B, respectively. The two halves of the kanji pattern are displayed at adjacent areas of the screen of the display device. On the screen, the unified kanji illustrated in FIG. 15 is displayed.

As has been described, according to a preferred embodiment of the present invention, kanji can be displayed before the activation of the operating system by employing the display adapter (video adapter) for alphanumeric characters (nonkanji) without using a large-capacity ROM as is commonly utilized in systems having an adapter for kanji. Utilizing the described embodiment of the present invention, both kanji and kana can be displayed.

While the invention has been particularly shown and described with reference to a preferred embodiment, it will be understood by those skilled in the art that various changes in form and detail may be made therein without departing from the spirit and scope of the invention.

I claim:

1. A method for displaying a character within a display device of a data processing system, said data processing system including a memory, said method comprising:

storing within said memory a plurality of image codes and a plurality of images, wherein each of said plurality of image codes is stored in association with one of said plurality of images, and wherein a character is composed of a plurality of juxtaposed images;

receiving image codes corresponding to each of a plurality of images comprising a selected character to be displayed within said display device;

in response to receipt of said image codes, searching said memory to locate said image codes; and in response to locating said image codes within said memory, displaying said selected character within said display device by simultaneously displaying each of said plurality of images comprising said selected character in juxtaposition such that said plurality of images do not overlap.

2. The method for displaying a character within a display device of claim 1, wherein each of a plurality of images comprising a character has a substantially equal area.

3. The method for displaying a character within a display device of claim 1, wherein each of said steps of storing, receiving, searching, and displaying is performed within said data processing system prior to invocation of an operating system of said data processing system.

4. A method for displaying a character within a display device of a data processing system, said data processing system including a memory, said method comprising:

storing within a first portion of said memory a plurality of images corresponding to a subset of all characters which may be displayed within said display device, wherein each character within said subset is composed of a plurality of juxtaposed images, and wherein each image stored within said first portion of said memory is associated with an image code;

in response to receipt of image codes corresponding to a selected character to be displayed within said display device, determining if said selected character is a member of said subset;

in response to a determination that said selected character is a member of said subset, searching said first portion of said memory to locate a plurality of images associated with said image codes corresponding to said selected character; and displaying said selected character within said display device by simultaneously displaying in juxtaposition said plurality of images associated with said image codes corresponding to said selected character, wherein said plurality of images are displayed such that said plurality of images do not overlap.

5. The method for displaying a character within a display device of claim 4, and further comprising:

in response to a determination that said selected character is not a member of said subset, determining if said selected character is a control character;

in response to a determination that said selected character is a control character, performing processing steps specified by said selected character; and in response to a determination that said selected character is not a control character, displaying said selected character within said display device.

6. The method for displaying a character within a display device of claim 4, and further comprising:

calculating image codes corresponding to said selected character utilizing a prescribed equation.

7. The method for displaying a character within a display device of claim 4, and further comprising:

storing images in a second portion of said memory, wherein said images stored within said second portion of memory correspond to characters which may be displayed within said display device that are not members of said subset, wherein each character not a member of said subset comprises a single image.

8. The method for displaying a character within a display device of claim 7, wherein said selected character is not a member of said subset, and wherein said step of displaying said selected character within said display device comprises:

searching said second portion of said memory to locate an image corresponding to said selected character; and displaying said image corresponding to said selected character within said display device.

9. The method for displaying a character within a display device of claim 4, wherein said selected character corresponds to a first image within said subset and to a second image not within said subset, and wherein one of said first or said second images is designated as a primary font and the other of said first or second images is designated as a secondary font.

10. The method for displaying a character within a display device of claim 4, wherein each of said steps of storing, determining, searching, and displaying is performed within said data processing system prior to invocation of an operating system of said data processing system.

11. A system for displaying a character within a display device of a data processing system, comprising:

a memory for storing a plurality of image codes and a plurality of images, wherein each of said plurality of image codes is stored in association with one of said plurality of images, and wherein a character is composed of a plurality of juxtaposed images;

means for receiving image codes corresponding to each of a plurality of images comprising a selected character to be displayed within said display device;

means, responsive to receipt of said image codes, for searching said memory to locate said image codes; and means, responsive to locating said image codes within said memory, for displaying said selected character within said display device by simultaneously displaying each of said plurality of images comprising said selected character in juxtaposition such that said plurality of images do not overlap.

12. The system for displaying a character within a display device of claim 11, wherein each of a plurality of images comprising a character has a substantially equal area.

13. The system for displaying a character within a display device of claim 11, wherein said memory which stores said plurality of images comprises a video memory associated with a display device adapter.

14. A system for displaying a character within a display device of a data processing system, comprising:

a first portion of memory, wherein said first portion of memory stores a plurality of images corresponding to a subset of all characters which may be displayed within said display device, wherein each character within said subset is composed of a plurality of juxtaposed images, and wherein each image stored within said first portion of said memory is associated with an image code;

means, responsive to receipt of image codes corresponding to a selected character to be displayed within said display device, for determining if said selected character is a member of said subset;

means, responsive to a determination that said selected character is a member of said subset, for searching said first portion of said memory to locate a plurality of images associated with said image codes corresponding to said selected character; and means for displaying said selected character within said display device by simultaneously displaying in juxtaposition said plurality of images associated with said image codes corresponding to said selected character, wherein said plurality of images are displayed such that said plurality of images do not overlap.

15. The system for displaying a character within a display device of claim 14, and further comprising:

means, responsive to a determination that said selected character is not a member of said subset, for determining if said selected character is a control character;

means responsive to a determination that said selected character is a control character, for performing processing steps specified by said selected character; and means, responsive to a determination that said selected character is not a control character, for displaying said selected character within said display device.

16. The system for displaying a character within a display device of claim 14, and further comprising:

means for calculating image codes corresponding to said selected character utilizing a prescribed equation.

17. The system for displaying a character within a display device of claim 14, and further comprising:

a second portion of memory, wherein said second portion of memory stores images corresponding to characters which may be displayed within said display device that are not members of said subset, wherein each character not a member of said subset comprises a single image.

18. The system for displaying a character within a display device of claim 17, wherein said selected character is not a member of said subset, and wherein said means for displaying said selected character within said display device comprises:

means for searching said second portion of said memory to locate an image corresponding to said selected character; and means for displaying said image corresponding to said selected character within said display device.

19. The system for displaying a character within a display device of claim 14, wherein said selected character corresponds to a first image within said subset and to a second image not within said subset, and wherein one of said first or said second images is designated as a primary font and the other of said first or second images is designated as a secondary font.

20. The system for displaying a character within a display device of claim 14, wherein said first portion of memory which stores said plurality of images comprises a video memory associated with a display device adapter.

* * * * *